United States Patent [19]

Evans et al.

[11] 4,428,550
[45] Jan. 31, 1984

[54] VIBRATION-INSULATING STABILITY IMPROVING TORQUE FORCE DEVICE

[76] Inventors: Hugh G. Evans, W. 214 6th Ave.; Stephen Speer, S. 358 Couer d'Alene, Apt. #6; James S. Christy, E. 10918 26th, all of Spokane, Wash. 99204

[21] Appl. No.: 313,470

[22] Filed: Oct. 21, 1981

Related U.S. Application Data

[63] Continuation-in-part of Ser. No. 282,057, Jul. 10, 1981, abandoned.

[51] Int. Cl.³ .............................................. B64C 17/04
[52] U.S. Cl. .................................. 244/93; 244/75 A; 244/220; 244/80; 267/57.1 A
[58] Field of Search ................ 244/75 A, 76 R, 76 C, 244/80, 93, 220, 223; 188/378, 379; 248/562, 592, 605, 608; 267/57.1 A, 154, 153, 141.2

[56] References Cited

U.S. PATENT DOCUMENTS 2,797,882  7/1957  Servanty ........................... 244/76 R
2,941,792  6/1960  Stutz ..................................... 244/80
3,006,627 10/1961  Paulsen ............................ 267/57.1

FOREIGN PATENT DOCUMENTS 763753  12/1956  United Kingdom ............... 188/379

Primary Examiner—Trygve M. Blix
Assistant Examiner—Rodney Corl
Attorney, Agent, or Firm—Barry G. Magidoff

[57] ABSTRACT

A conventional aircraft having horizontal stabilizers and hinged elevators, which is controlled, preferably, through push-pull rods, is provided with a dynamic torque (bob) weight connected to a rotating member, in the direct line of control to the elevator surfaces. The torque member is located in the nose portion of the aircraft with its center of gravity angled up from 20° to 50° when the elevator surfaces are in the neutral position. The torque member is also mounted in a flexible manner to isolate it from horizontal tail vibrations, or flutter.

18 Claims, 7 Drawing Figures

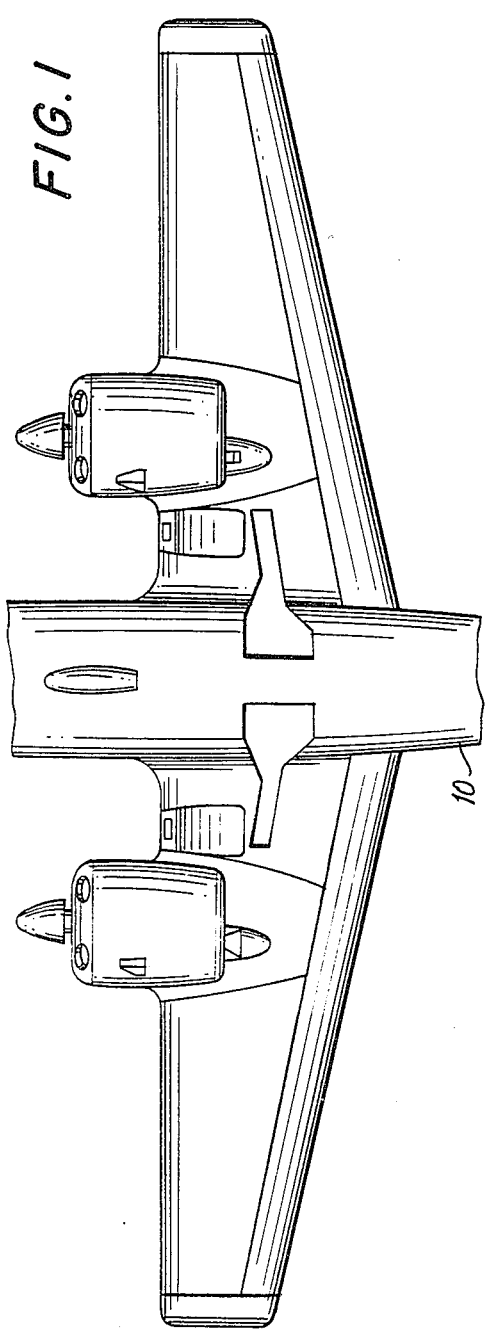
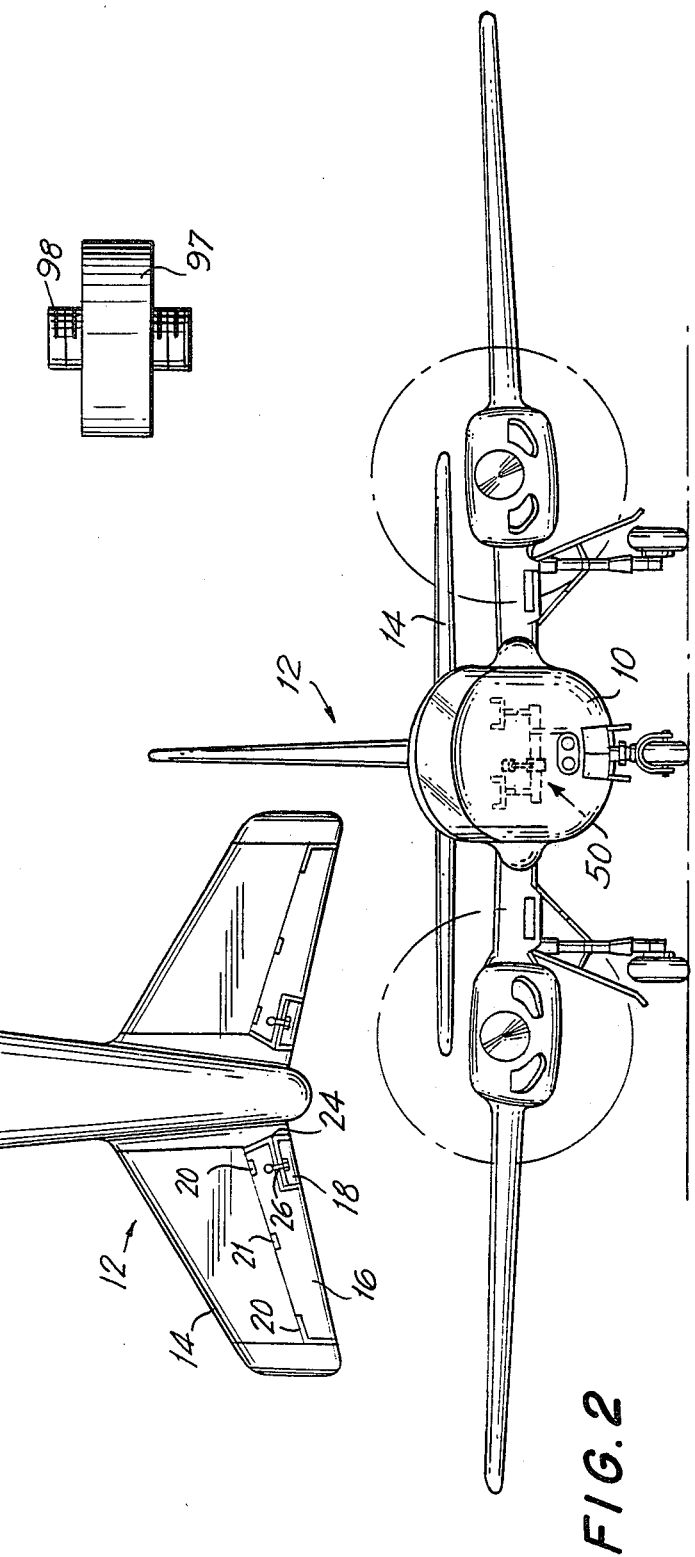

VIBRATION-INSULATING STABILITY IMPROVING TORQUE FORCE DEVICE

This application is a continuation-in-part of copending application Ser. No. 282,057, filed July 10, 1981 and now abandoned.

This invention relates to a conventional aircraft, and more particularly to means for improving the stability of such aircraft by the attachment of a torque inducing member.

Testing for dynamic longitudinal, or pitch, stability is a requirement prior to certification of an aircraft as being commercially safe, for example, by the Federal Aviation Administration in the United States. Passing such tests requires that pitching oscillations are convergent when the aircraft stick is sharply released from either a push down, or pull up, input. A system resulting in divergent oscillations can ultimately reach an extreme nose up position, where the aircraft stalls, or an extreme nose down position, or dive, where the aircraft exceeds the design indicated airspeed; a convergently oscillating system ultimately returns to stable flight after damping of the oscillation.

The susceptibility of an aircraft to unstable pitch oscillations is a function of a variety of factors: A long fuselage section forward of the wing, short distance between the wing and horizontal tail, and center of gravity (c.g.), extremely aft or forward of the aerodynamic center, are factors affecting longitudinal stability.

To improve longitudinal stability, conventional design techniques incorporate either a passive system or an active control system. Active control systems have been employed, wherein an external vane senses the aircraft's attitude and through a servo control system makes the appropriate input to the elevator control system. Passive systems have employed a down spring to apply a constant push load on the control yoke. This causes more corrective deflection of the elevator as the nose of the airplane pitches up and airspeed diminishes. Another passive system utilizes a 'bob weight' attached to a vertically moving member in the elevator control system which generates a corrective force input for either nose up or nose down angular rotations of the aircraft about its center of gravity.

It is also desirable, to design a fully safe aircraft for general aviation use, that there be an increasing gradient for the stick force required to move the elevators under increasing "g" loads. Such an increase in gradient prevents an excessively sharp turning of the aircraft, for example, out of a sharp dive, thereby limiting the stress that would be too quickly applied to the structure of the aircraft, especially its wings, when pulling up out of a dive.

In accordance with the present invention, there is provided in a conventional monoplane aircraft, comprising a tail with separate rudder and horizontal stabilizer surfaces, and pivotable elevators mounted on the trailing edges of the horizontal stabilizer surfaces; preferably twin engines, one mounted on each wing, such that the aircraft's center of gravity is located approximately between 10% and 30% of the wing mean aerodynamic chord; and an elevator control system comprising a manually controlled rotating member and direct motion-transmitting means between the rotating member and the elevators, designed to pivotally move the elevators in response to rotation of the rotating member; an improvement which comprises a constant mass torque member attached such that the center of gravity of the torque member is at a constant radial distance from the axis of rotation of the rotating member. The torque member is connected to the rotating member by a vibration isolating joint preferably at a radially inwardmost portion of the torque member. Preferably, the distance between the axis of the rotating member and the center of gravity of the torque member, i.e., the effective torque arm, is at least about three inches, preferably at least about four inches, and most preferably at least about six inches; optimally the distance is not more than about seven inches. The total mass of the torque member is preferably at least about five (5) pounds and most preferably at least about six (6) pounds; most preferably the mass is not greater than about ten (10) pounds, and optimally not greater than about eight (8) pounds.

In the preferred embodiment, the torque member is attached to the circumference of the rotating member, intersecting a diameter of the rotating member. Within the rotating travel of the torque member, it has been surprisingly found that the effective torque arm should extend at an angle above the longitudinal axis of the aircraft of between about 20° and 50°, and preferably about 30° and 40°, when the elevator is in its neutral position. More preferably, the torque member does not extend below the longitudinal axis during any part of the rotational travel of the elevator. The total rotating travel of the torque member extends between the full down position and the full up position of the elevators, respectively. Preferably, the mechanical advantage of the motion transmitting means is such that for each angular degree of rotation of the elevator, the rotating member, and thus the torque member, rotates between about two and three angular degrees, and preferably between about 2¼ and about 2½ degrees.

In the accompanying drawings, an example of an advantageous embodiment of the apparatus in accordance with the present invention is set forth. The apparatus is shown and described in schematic terms, often in an essentially symbolic manner, because of the conventional nature of the major portion of the apparatus shown. Appropriate structural details for actual operation, where not explicitly set forth, are generally known and understood and need not be set forth in greater detail herein, as they are not part of the present invention. By eliminating the specific disclosure of such conventional apparatus, the scope and concept of the present invention becomes emphasized and clarified. Reference is made to conventionally available elements by both a generic description thereof and by a reference to a specific example of a suitable aircraft, the Piper Aerostar, twin-engine airplane. The details of this aircraft are, therefore, well known to the art and their detailed descriptions are thus readily available from other known sources, and indeed are on file with the Federal Aviation Administration of the United States ("FAA").

In the drawings

FIG. 1 is a bottom plan view of a Piper Aerostar aircraft incorporating the improvements of this invention;

FIG. 2 is a front view of the Piper Aerostar;

FIG. 7 is a side view of a vibration insulating mounting member.

Figure 3:
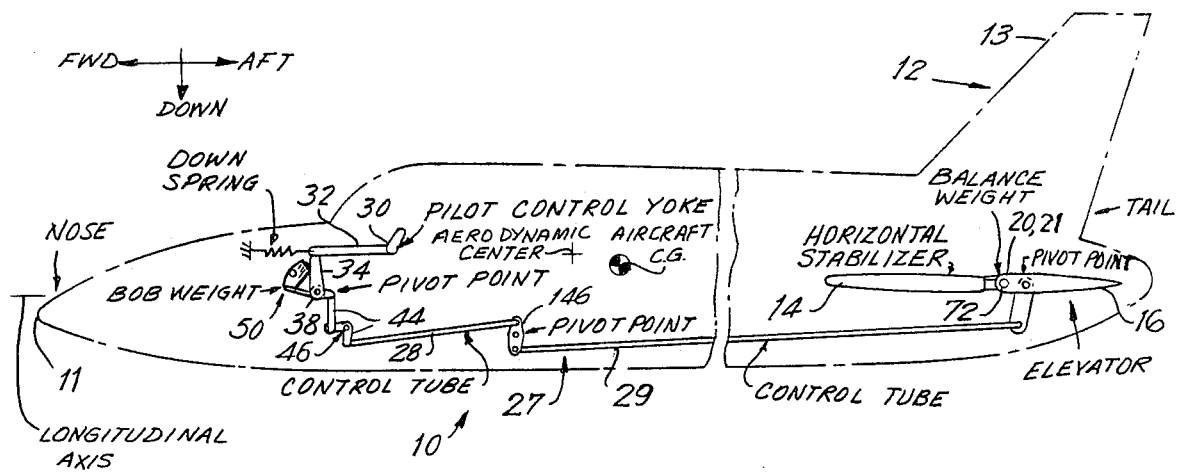
FIG. 3 is a schematic side elevation view of the Piper Aerostar locating a preferred embodiment of this invention within the aircraft.
Figure 4:
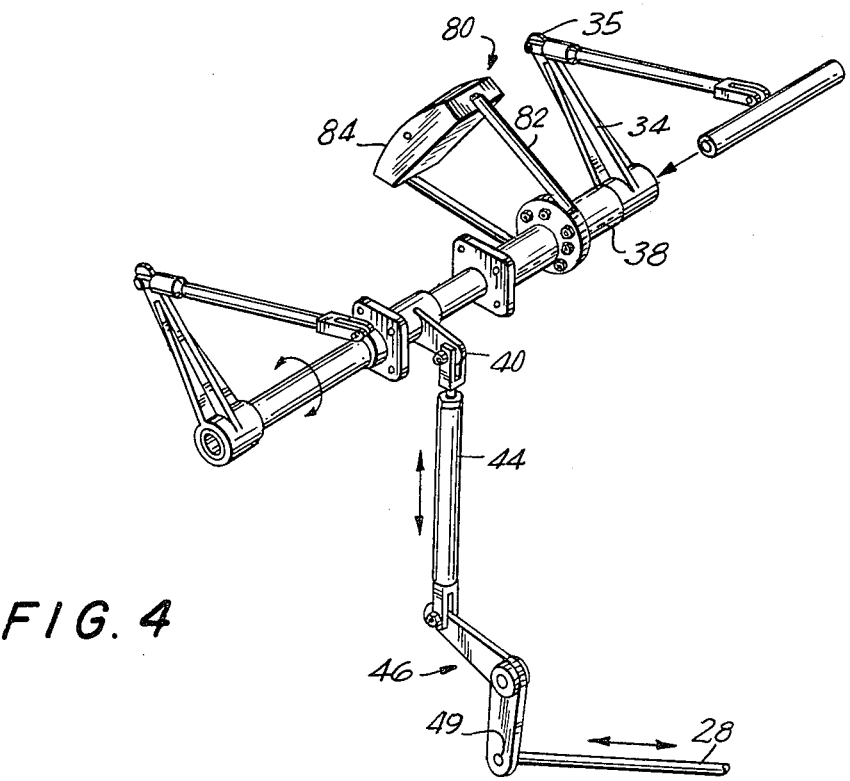
FIG. 4 is an enlarged perspective view of the preferred embodiment shown in FIG. 3.
Figure 5:
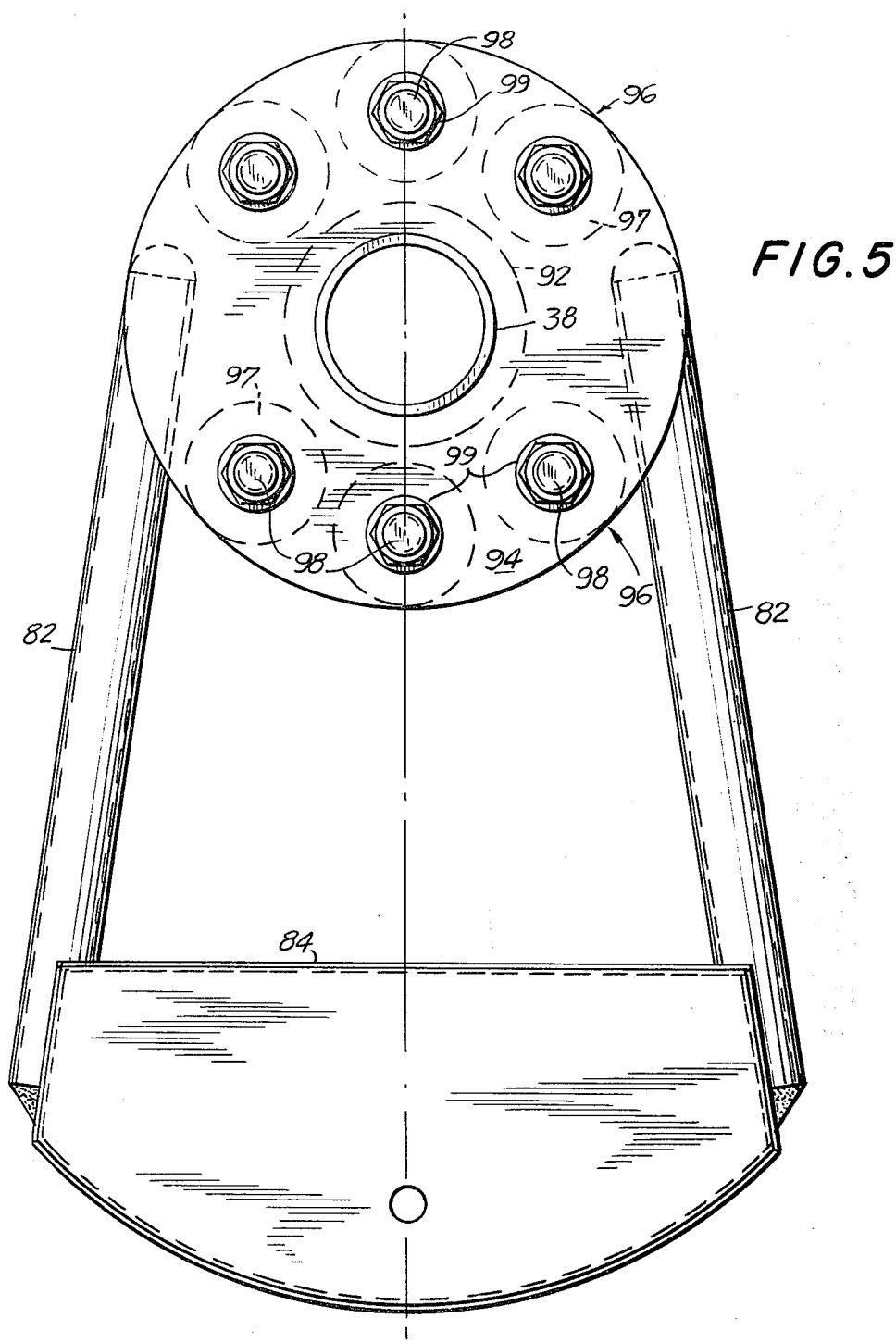
FIG. 5 is a side view of the bob weight used on a embodiment of FIG. 4.
Figure 6:
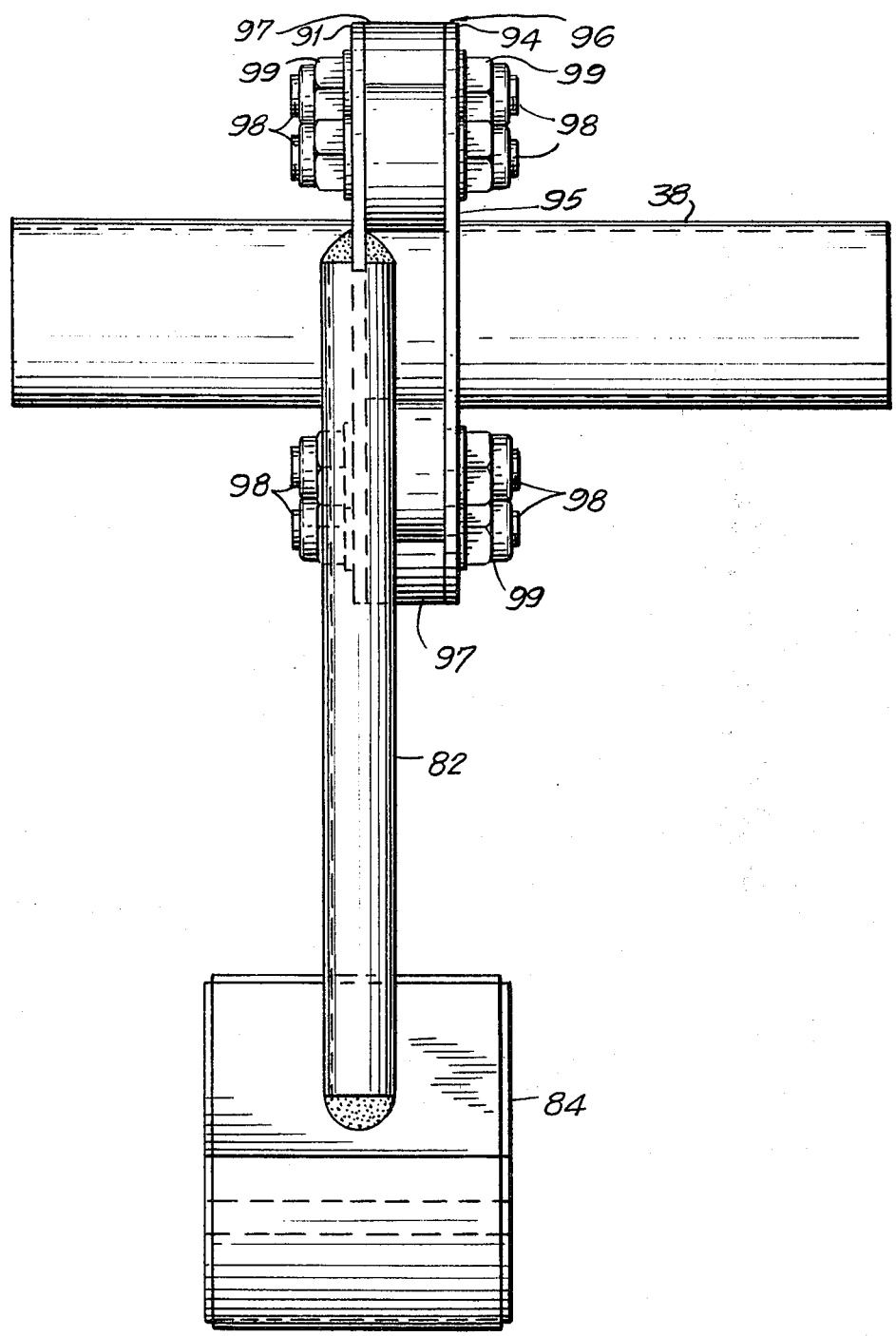
FIG. 6 is a top elevation view of the bob weight.

In the preferred embodiment shown in the drawings herewith, a Piper Aerostar aircraft, FAA Type Certificate TC-A17WE, is most effectively modified by adding the bob weight assembly of the present invention. This invention is most especially effective when used on those models where the power plant has been upgraded to increase effective power output.

It is well known that increasing the power of an aircraft engine, without otherwise modifying the aircraft, normally tends to degrade stability, in the sense that any stability weaknesses of the aircraft are magnified by the presence of the additionally powerful engine. Applying the present invention to such an upgraded aircraft results in a significant improvement in stability with a marginal, if any, effect on the maneuverability of the aircraft. As the Piper Aerostar is noted for its speed and maneuverability, the maintenance of these features would be especially important to the owners or pilots of this aircraft.

Referring to the drawings, the Aerostar aircraft is a twin-engine, midwing aircraft having a center of gravity (c.g.) that is generally farther behind the nose of the aircraft than is generally found in most other private general aircraft types, i.e., approximately six to seven feet behind the nose 11. The wings are substantially midheight on the fuselage 10 and the tail assembly 12 includes a vertical rudder 13 and horizontal stabilizer surfaces 14 of a generally conventional aspect. Separate elevators 16 are hingedly connected to each horizontal stabilizer 14 by hinges 20, 21. A trim tab assembly 18 is located at the inboard end of the trailing edge of each elevator and is operated by push rods and arms 26.

Pilot control over the elevators is manual and extends through a push-pull rod system 27 utilizing rigid control rods 28, 29. From the pilot control yokes 30, a pair of which are located in the pilot's compartment, control push rods 32 are pivotally connected to control crank arms 34 through a pivot 35. The control crank 34 is in turn rigidly connected to a control torque tube 38. A down spring 132 can be used to bias the push rod forward. The control rods 28, 29, 44 move longitudinally along separate lines, connected by cranks 46, 146.

The ends of the control torque tube 38 are rotatably supported from the fuselage of the aircraft. Centrally located on the control torque tube 38 and extending rearwardly therefrom is a driving crank 40, which is in turn pivotally connected to a vertical control member 44 through a pivot 41. The lower end of the vertical control member 44 is in turn pivotally connected to a forward upper end of a bell crank 46 through an upper pivot 47. The central vertex of the bell crank 46 is pivotally supported from the main fuselage of the aircraft. The lower end of the bell crank 46 is in turn connected to the elevator control rod 28 by way of pivot 49. For this configuration there is approximately a 2.4 degree angular rotation of control torque tube 38 for each degree of elevator angular rotation.

The elevator control assembly as described above and as shown in the drawings is generally conventional and found on factory assembled Aerostar aircraft according to the above type certificate. In accordance with this invention, a bob weight, generally indicated by the numeral 50, is connected to the torque tube 38, so as to rotate with the torque tube 38. The bob weight, as shown in this embodiment, comprises two parallel arms 52 and 53 which at one end are rigidly secured to the torque tube 38 and at the other end flexibly attached to a weight member 54 via resilient mounts 56. The weight member 54 in this embodiment is a hollow, hemi-cylindrical shape into which can be loaded additional weights in order to properly tune the device.

It has been found that the most effective configuration of the bob weight 80 with respect to its being secured to the torque tube 38 is obtained when the centerline, or effective torque arm of the bob weight, (indicated by the letter "C"), extends forwardly and upwardly from the torque tube at an angle of about 35 degrees above the longitudinal axis, when the control push rods 32 are in their level position, i.e., when the elevators 16 are in the neutral position.

In this improved embodiment as shown in the drawings, the effective torque arm C of the bob weight 80, is the straight line perpendicularly intersecting the axis of the torque tube 38, and extending to the center of gravity of the bob weight, in this example, midway between the support arms 82 for the weight member 84. In the improved embodiment shown in these drawings, the centerlines of the two support arms 82 do not intersect the axis of the torque tube 38, but preferably are both juxtaposed laterally thereof but in a plane transverse to the axis of torque tube 38, and most preferably substantially perpendicular thereto.

The first ends of the support arms 82 are shown as being rigidly secured to the outer edges of the weight member 84. A flexible mount can be used here if desired. The second ends of the support arms 82 are secured to an annular flat support plate 91. The support plate 91 is substantially circular and concentric with the torque tube 38. The torque tube 38 passes through a central opening 92 in the support plate 91 without direct contact therewith.

The support plate 91 is in turn mounted onto an annular torque plate 94, which is preferably substantially parallel to the support plate 91. The torque plate 94 is concentric to, and secured to, the torque tube 38 by its central opening 95.

The support plate 91 is mounted onto the torque plate 94 by a series of vibration-damping shock mounts, generally indicated by the numeral 96. In the embodiment shown, there are two sets of three shock mounts 96, each set being symmetrically disposed about the effective torque arm of the bob weight 80. The two support arms 82 are connected to the outer portion of the support plate 91 so as to separate the two sets of shock mounts 96, which are also symmetrical to the axis of the torque tube 38.

The shock mounts are commercially available, and well known, devices comprising a cylindrical, resilient plug 97 having secured to, and extending axially outwardly from, each end face of the plug 97, a threaded bolt stub 98. An internally threaded nut 99 secures onto each bolt stub 98, and is tightened down to secure the torque plate 94 to the support plate 91.

The improved embodiment of this invention, by providing the vibration-insulating mount at the inner end of the effective torque arm C, permits the use of a stiffer mounting means, than if the vibration-insulating mount was located at the outer end of the torque arm. Stiffer mounts are generally mechanically stronger, and are also generally more easily tuned to avoid the relatively higher frequency flutter vibrations, without being susceptible to the relatively lower frequency pitching oscillations. Furthermore, the use of multiple vibration-insulating mount connectors provides a safety margin in the event one or more of the mounts 96 rupture.

When the control push rods are in their rearwardmost position and the elevators 16 in their full up position (30 degrees up), the effective torque arm C extends rearwardly and at an angle of 15 degrees past the vertical axis; at their forwardmost position, when the elevators 16 are in their full down position (10 degrees down), the torque arm C extends forward and at an angle of about 10 degrees above the longitudinal axis of the aircraft.

The bob weight 80 can be located on either side of the vertical member 44, between the vertical member 44 and either control crank arm 36, or one weight provided at each location.

In this preferred embodiment, the bob weight can be filled with lead, either pellets or molded lead, or other dense material, within the member 84, to a total, including the arms 82, of about eight pounds. The radial distance from the axis of the control torque tube 38 to the radially outwardmost portion of the weight 84 is about 7⅛ inches, and to the center of gravity of the weight is about 6 inches. In the embodiment shown in the drawings, the torque arms 82 are connected to diametrically opposite outer portions of the support plate 91, which has a radius of about 4 inches. The support arms 82 diverge outwardly towards the weight member 84; the outermost sides of the weight member 84, to which the arms 82 are attached, are 5¼ inches apart. The centerlines of the support arms 82 are approximately in a single plane, approximately perpendicular to the axis of the torque tube 38.

A suitable vibration-insulating mount can be formed, preferably, of an elastomeric material, such as a rubber, e.g., natural latex rubber, or a synthetic rubber such as neoprene, or a silicone rubber. The advantage of the design described herein, where the vibration-insulating mount is located at the inner end of the effective torque arm, i.e., close to the axis of rotation, is the greater dynamic shear stiffness permitted for the vibration-insulating material (e.g. the elastomer), of preferably greater than 70 pounds per inch, and most preferably from about 70 to about 90 lbs./in. for each of the mounts 97. When the elastomer is at the outer end of the effective torque arm, the dynamic shear stiffness coefficient may have to be as low as 7-8 pounds per inch.

In the system shown in the accompanying drawings, the damping coefficient is preferably at least about 9 percent of critical damping. Each individual mount 97, for example, has a diameter of about 1 inch and a thickness of at least about 1 inch. It must be noted that a similar effect can be obtained by using a single annular disc of elastomer in place of the individual mounts 97. The disc surrounds the torque tube 38 and can be attached to the support plate 97 and the torque plate 94 in the same manner as the mounts 97 shown in the drawings.

The various parameters used in the design of the vibration-insulated bob weight are at least approximately related in accordance with the following simplified equation I:

$$W = \frac{1}{2\pi}\sqrt{\frac{K_T}{J}} \quad (I)$$

wherein:
 W = fundamental frequency
 $J = Ml^2$
 $K_T = N(K_{Sh} \times d)$
 M = bob weight mass = wt(lbs.)/gc
 gc = 386
 l = effective torque arm length (ins.)
 $K_{Sh}$ = dynamic shear stiffness coefficient of mount (lbs./in.)
 N = number of individual mounts
 d = mean radial distance from axis to center of mount The control torque tube 38 is located in the normal position for the Aerostar aircraft; in this case it is located such that the axis of the control torque tube 38 is perpendicular to the longitudinal axis of the aircraft and located about five feet aft of the aircraft datum and about nine feet forward of the center of gravity of the aircraft.

Placing the bob weight in the configuration shown, also assists in providing a positively increasing gradient for the stick force upon increase in the g-forces when controlling a dive of the airplane. Furthermore, the bob weight must be so designed so as not to exacerbate, or even to reduce, the problem of flutter, or higher frequency vibrations.

An airplane is a relatively flexible structure, and therefore dynamic considerations must be incorporated in the elevator control system design. As a result, aerodynamic forces associated with aircraft speed cause the horizontal stabilizer and elevator to vibrate; should this externally generated or forcing, vibration have a frequency that approaches or equals the natural frequency of the horizontal tail structure, increasingly severe vibrations called flutter can develop, resulting in damage or destruction of the horizontal tail. In order to prevent flutter that might arise because the elevator pivot points are connected to the horizontal stablilzer, it is conventional to utilize balance weights added to the elevator leading edge, forward of the pivot axis. These balance weights counteract the generation of rotational inputs to the elevators by any vibration-caused displacements of the horizontal stabilizer. It is well known that a small rotational input to the elevators can generate a large increase in the aerodynamic forces acting on the horizontal tail; a coupling of the horizontal stabilizer displacements and elevator rotation could thus be catastrophic.

The forcing vibrations and the resultant rotational effect on the elevators increase with aircraft speed. Consequently, an aircraft is limited in the maximum safe air speed it can maintain by the flexibility of its structure (horizontal surfaces of the tail or wing) and control system (elevators, rudder, or ailerons).

When considering the effect of the bob weight installation on flutter, it must first be noted, as shown on FIG. 3, that the mass of the bob weight 50 acts opposite to the balance weights 72 located on the elevator leading edge. The bob weight 50 could thus diminish the effectiveness of the elevator balance weights 72 in uncoupling the elevator rotational mode from the horizontal stabilizer bending mode caused by vibration. This is most especially a problem in the present case, wherein the elevator control system consists of rigid push-pull tubes 28, which do not have the inherent flexibility to isolate the bob weight from the horizontal tail resonant frequencies. In order to prevent damage to the aircraft from flutter, the bob weight should preferably be mounted with sufficient flexibility to be isolated from the horizontal tail vibrations.

Since the horizontal stabilizer fundamental natural frequency is normally between 10 and 20 cycles per second (Hz) for most aircraft, the bob weight mounting should be tuned to have a fundamental natural frequency below 7 Hz. For the Piper Aerostar, the horizontal stabilizer fundamental natural frequency is approximately 14 Hz; thus, if the bob weight mounting had a natural frequency of 4 to 6 Hz, sufficient isolation could be maintained. It should be noted that the bob weight mounting should also be kept above 1 Hz to isolate it from the low frequency pitch stability oscillation.

The required dynamic shear stiffness coefficient for each mount 97 shown in the accompanying drawings can be determined from Equation I, above, selecting a desirable bob weight fundamental frequency, for example, of 5.2 Hz, as follows:

$$5.2 = \frac{1}{2\pi} \sqrt{\frac{(K_{Sh} \times 1.5)(6)}{(8/386) \times (5.75)^2}}$$

$$K_{Sh} = 80 \text{ lbs./in.}$$

As stated above, the natural frequency of the present improved stability improving device is more easily tuned than if the vibration mounts were located at the outer radial arm.

When applying this invention to aircraft other than the Aerostar, it is necessary to take into account not only the total weight of the aircraft, but also the distance between the center of gravity of the aircraft, its nose and the aerodynamic center. The necessary weight of the bob weight, and the moment arm, or distance from the bob weight center of gravity to the axis of the torque tube 38, is also determined by the weight of the aircraft and distance between the aircraft center of gravity and the axis of the torque tube 38.

The center of gravity of the aircraft is preferably at least about 5 feet to the rear of the axis of the rotating control tube, and most preferably from about 6 to about 10 feet to the rear of the control tube axis.

We claim:

1. In a conventional aircraft comprising wing surfaces mounted on a fuselage, a tail having a separate vertical rudder and horizontal stabilizer surfaces, with elevators pivotally mounted on the trailing edges of the horizontal stabilizers; and a control system for manually pivoting the elevators, the control system comprising a manually controlled, laterally extending, rotating control member and direct motion-transmitting means comprising relatively rigid, vibration-carrying members, between the rotating member and the elevators, designed to pivotally move the elevators in response to rotation of the rotating control member, the improvement which comprises a constant mass torque member fixedly connected to the rotating member such that the torque member is at a substantially constant radial distance from the axis of rotation of the rotating member, the center of gravity of the torque member being at least about two inches radially distant from the axis of the rotating control member, along a radial line defining the effective torque arm, and a resilient vibration insulating connecting joint between the torque member and the rotating member being located relatively radially inwardly towards the axis of the rotating member from the center of gravity of the torque member, whereby the fundamental natural frequency of the torque member and the rotating member is less than the fundamental natural frequency of the horizontal stabilizer and greater than the pitch stability oscillation frequency.

2. The aircraft of claim 1 wherein the direct motion-transmitting means comprises a series of substantially rigid members that move principally linearly, and interconnecting pivot members, pivotally connected to each of two such members to translate the movement of the first such member along one line, to movement of the second such member along a second line.

3. The aircraft of claim 1 comprising an effective torque arm between the center of gravity of the torque member and the control member axis of rotation of at least about five inches in length.

4. The aircraft of claim 3 wherein the total mass of the torque member is preferably at least about six pounds.

5. The aircraft of claim 4 wherein the torque member comprises at least one longitudinal member extending transversely outwardly from the rotating member, the end nearest the rotating member being secured to the connecting joint, and wherein the dynamic shear stiffness coefficient is at least about 70 pounds per inch.

6. The aircraft of claim 1 wherein the torque member comprises at least one longitudinal member extending transversely outwardly from the rotating member, the first end nearest the rotating member being secured to the connecting joint.

7. The aircraft of claim 6 wherein the connecting joint is a compound joint comprising a plurality of vibration-insulating members independently connected between the rotating member and the longitudinal member.

8. The aircraft of claim 7 wherein the torque member comprises at least a pair of rigid longitudinal support members and a torque weight, each longitudinal support member being connected at its first end to the connecting joint and at its second end to the torque weight, and wherein the connecting joint comprises a first plate secured to the rotating member and extending transversely outwardly from the rotating member, and secured to the vibration-insulating member; a second plate secured to vibration-insulating members and extending transversely outwardly from the rotating member, the second plate being secured to the longitudinal support members.

9. The aircraft of claim 8 wherein the aircraft is a Piper Aerostar.

10. The aircraft of claim 9 wherein the fundamental natural frequency of the torque member is in the range between about 4 Hz and about 6 Hz.

11. In the improvement to the conventional aircraft of claim 1, wherein the radial line between the center of gravity of the torque member and the axis of the control member, extends at an angle of at least about 20° above the longitudinal axis of the aircraft when the elevator is in its neutral position.

12. The aircraft of claim 11 wherein the axis of the rotating control member is at least about five feet forward of the center of gravity of the aircraft.

13. The aircraft of claim 11 wherein the effective torque arm extends forwardly from the control member at an angle of between about 8 degrees and 12 degrees above the longitudinal axis of the aircraft at its forwardmost point of travel, when the elevators are in the full down position.

14. The aircraft of claim 11 wherein the effective torque arm extends forwardly at an angle of between about 20 degrees and 50 degrees above the horizontal when the elevators are in the neutral position.

15. The aircraft of claim 14 wherein the effective torque arm extends forwardly of the rotating control member when the elevators are in the neutral position, at an angle in the range of from about 30 degrees to about 40 degrees above the horizontal.

16. The aircraft of claim 11 wherein the total weight of the torque member is in the range of between about 6 and about 8 pounds and wherein the effective torque arm distance is in the range of from about 4 inches to about 7 inches.

17. The aircraft of claim 16 wherein the torque member has a total weight in the range of from about 5 to about 10 pounds.

18. In a conventional aircraft comprising wing surfaces mounted on a fuselage, a tail having a separate vertical rudder and horizontal stabilizer surfaces, with elevators pivotally mounted on the trailing edges of the horizontal stabilizers; and a control system for manually pivoting the elevators, the control system comprising a manually controlled, laterally extending, rotating control member and direct motion-transmitting means comprisng relatively rigid, vibration-carrying members, between the rotating member and the elevators, designed to pivotally move the elevators in response to rotation of the rotating control member, the improvement which comprises a constant mass torque member comprising at least one rigid longitudinal member extending transversely outwardly from the rotating member and a torque weight connected adjacent one end thereof, the torque member being fixedly connected to the rotating member such that the torque member is at a substantially constant radial distance from the axis of rotation of the rotating member, the center of gravity of the torque member being at least about two inches radially distant from the axis of the rotating control member, along a radial line defining the effective torque arm, and a resilient, vibration-insulating, connecting joint between the second end of the longitudinal member and the rotating member, and being located relatively radially inwardly towards the axis of the rotating member from the center of gravity of the torque member, the connecting joint comprising a first plate secured to the rotating member and extending transversely outwardly from the rotating member; a vibration-insulating member; and a second plate secured to the vibration-insulating member and extending transversely outwardly from the rotating member, the second plate being secured to the longitudinal member; whereby the fundamental natural frequency of the torque member and the rotating member is less than the fundamental natural frequency of the horizontal stabilizer and greater than the pitch stability oscillation frequency.

* * * * *